United States Patent [19]

Speciner

[11] Patent Number: 5,361,139
[45] Date of Patent: Nov. 1, 1994

[54] METHOD FOR PRODUCING A MULTITONE IMAGE

[75] Inventor: Michael Speciner, Acton, Mass.
[73] Assignee: Camex, Inc., Culver City, Calif.
[21] Appl. No.: 182,378
[22] Filed: Jan. 12, 1994

Related U.S. Application Data

[63] Continuation of Ser. No. 715,527, Jun. 14, 1991, abandoned.

[51] Int. Cl.$^5$ .......................... H04N 1/46; G06K 9/42
[52] U.S. Cl. ..................................... 358/445; 358/500; 382/47
[58] Field of Search ............... 358/500, 501, 445, 448, 358/455, 461, 462; 382/47, 48-49, 54

[56] References Cited

U.S. PATENT DOCUMENTS

| | | | |
|---|---|---|---|
| 4,977,464 | 12/1990 | Ikuta | 358/461 |
| 5,157,507 | 10/1992 | Yamada | 358/462 |
| 5,285,271 | 2/1994 | Gennetten | 358/500 |

OTHER PUBLICATIONS

Robert Floyd and Louis Steinberg, "An Adoptive Algorithm for Spatial Grey Scale," Society for Information Display (SID) 75 Digest, pp. 36-37, 1975.
Thomas M. Holladay, "An Optimum Algorithm for Halftone Generation for Displays and Hard Copies," Proceedings of the SID, vol. 21/2, pp. 185-192, 1980.
Donald E. Knuth, "Digital Halftones by Dot Diffusion," ACM Transactions on Graphics, vol. 6, No. 4, pp. 245-273, Oct. 1987.

*Primary Examiner*—Richard E. Chilcot, Jr.
*Assistant Examiner*—Kinfe-Michael Negash
*Attorney, Agent, or Firm*—Freilich Hornbaker & Rosen

[57] ABSTRACT

The present invention relates to a method for producing multitone image data from data representative of an original image and, in particular, for producing multitone image data with a set of N output darkness levels U greater than 2 from original darkness values $V_o$ representative of an original image.

13 Claims, 2 Drawing Sheets

METHOD FOR PRODUCING A MULTITONE IMAGE

This application is a continuation of Ser. No. 07/715,527 filed Jun. 14, 1991 now abandoned.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a method for producing multitone image data from data representative of an original image and, in particular, for producing multitone image data with a set of N output darkness levels U greater than 2 from original darkness values $V_o$ representative of an original image. An alternative approach is described in a commonly assigned application to Michael Speciner, Ser. No. 07/810,462, now allowed.

2. Description of Related Art

Any photograph, painting, etc., consisting of a broad range of tones or gradation of tones is known as a continuous tone image or picture. In paintings, changing the pigment concentration or the amount of deposit of the printing media on a substrate modulates the color values throughout an entire picture. In photography, the different tones are created by varying amounts of silver, which appears black, in image areas.

In most forms of printing, tones cannot be reproduced by varying concentrations or amounts of ink. Many printing processes can print only a solid density of a color in an image area, while no ink prints in a non image area. In order to reproduce the varying tones of a continuous tone original image, a halftone process can be used to convert the original image into a pattern of very small and clearly defined dots. More specifically, the original image can be scanned with a light beam using an image scanner to obtain an electronic signal containing image information in the form of intensity levels or optical density variations corresponding to elemental picture areas, known as pixels, of the original picture. Then a thresholding technique can be used to generate data or an output that can cause a dot to be printed in a pixel of the halftone reproduction if the intensity level or optical density variation of the corresponding pixel in the original image exceeds a predetermined value. The output can be stored in a memory or used directly to drive a recorder, such as an exposing device, a printer or a computer display.

In halftoning processes, each dot in the reproduced image has the same tonal value or optical density. Various tones in the original are represented in the halftone image by a large number of evenly spaced dots which can have different sizes. Larger dots produce darker tones. Smaller dots or fewer dots make lighter tones. Halftones have the appearance of continuous tone images because of the limited resolving power of the human eye. When viewed at a normal reading distance, the individual dots blend into and appear like a "continuous" tone.

A rather different halftoning technique is based on the idea that there is an error associated with each halftone pixel which is the difference between its darkness value (which can only be reproduced by a printed dot or the absence of a printed dot) and the darkness value of the corresponding continuous tone original image pixel. If this error is distributed to neighboring pixels before the halftone thresholding is performed for them, the sum of the errors in a region can be minimized, thus faithfully reproducing the average darkness value in the region. The Floyd-Steinberg algorithm produces good halftone images using this technique. For further information on the Floyd-Steinberg algorithm, see "An Adaptive Algorithm for Spatial Grey Scale," by R. W. Floyd and L. Steinberg in SID 75 Digest, Society for Information Display, 1975, pages 36-37.

In the reproduction of color images, the original multicolored image is typically scanned through separate sets of colored filters to produce four separate image signals, corresponding to three primary colors and, possibly, black. The chosen primary colors for color printing are typically cyan, magenta and yellow. The chosen primary colors for a color computer display are typically red, green and blue. The separate signals are processed as described above. In other words, a color separation signal representative of a pattern of very small and clearly defined dots is generated for each of the colors where the dots in each of the patterns has the same tonal value or optical density throughout that pattern. Then the patterns for each color must be combined.

For instance, an exposing device may produce black and white film transparencies, corresponding to each of the cyan, magenta, yellow and black color separation signals, known as color separation transparencies or color separations for short. The color separations are used to make printing plates. The printing plates are mounted on a printing press to print, in registration, four overlapping single colored images to reconstruct the multicolored original.

The electronic output signals may also be used to directly drive a color printer or a computer display to produce a reconstructed multicolored image without ever producing actual color separations or printing plates.

It is desirable to provide a method for producing a multitone image using a set of at least 3 output darkness values (or levels) for at least one output color from data representative of an original image.

SUMMARY OF THE INVENTION

The present invention is related to a method for producing a multitone image corresponding to an array of output pixels (i, j) using a set of at least 3 output darkness levels $U(i,j)$ for at least one output color from original darkness values $V_o(s,t)$ of an array of input pixels (s,t) representative of an original image, comprising:

determining one of the output darkness levels $U(i, j)$ corresponding to selected ones of the original darkness values $V_o(s,t)$ using the following equations:

$E_{in}(i,j) = a*E_{out}(i,j-1) + b*E_{out}(i-1, j+1) + c*E_{out}(i-1, j) + d*E_{out}(i-1, j-1)$, $U(i,j) = \lfloor (N-1)V_o(s,t) + E_{in}(i,j) + \frac{1}{2} \rfloor$, $E_{out}(i,j) = (N-1)V_o(s,t) + E_{in}(i,j) - U(i,j)$, where a, b, c and d are constants; and using the output darkness levels $U(i,j)$ to produce the multitone image representative of the original image.

BRIEF DESCRIPTION OF THE DRAWINGS

The invention can be more fully understood from the following detailed description thereof in connection with accompanying drawings described as follows.

DESCRIPTION OF THE PREFERRED EMBODIMENT(S)

Figure 1:
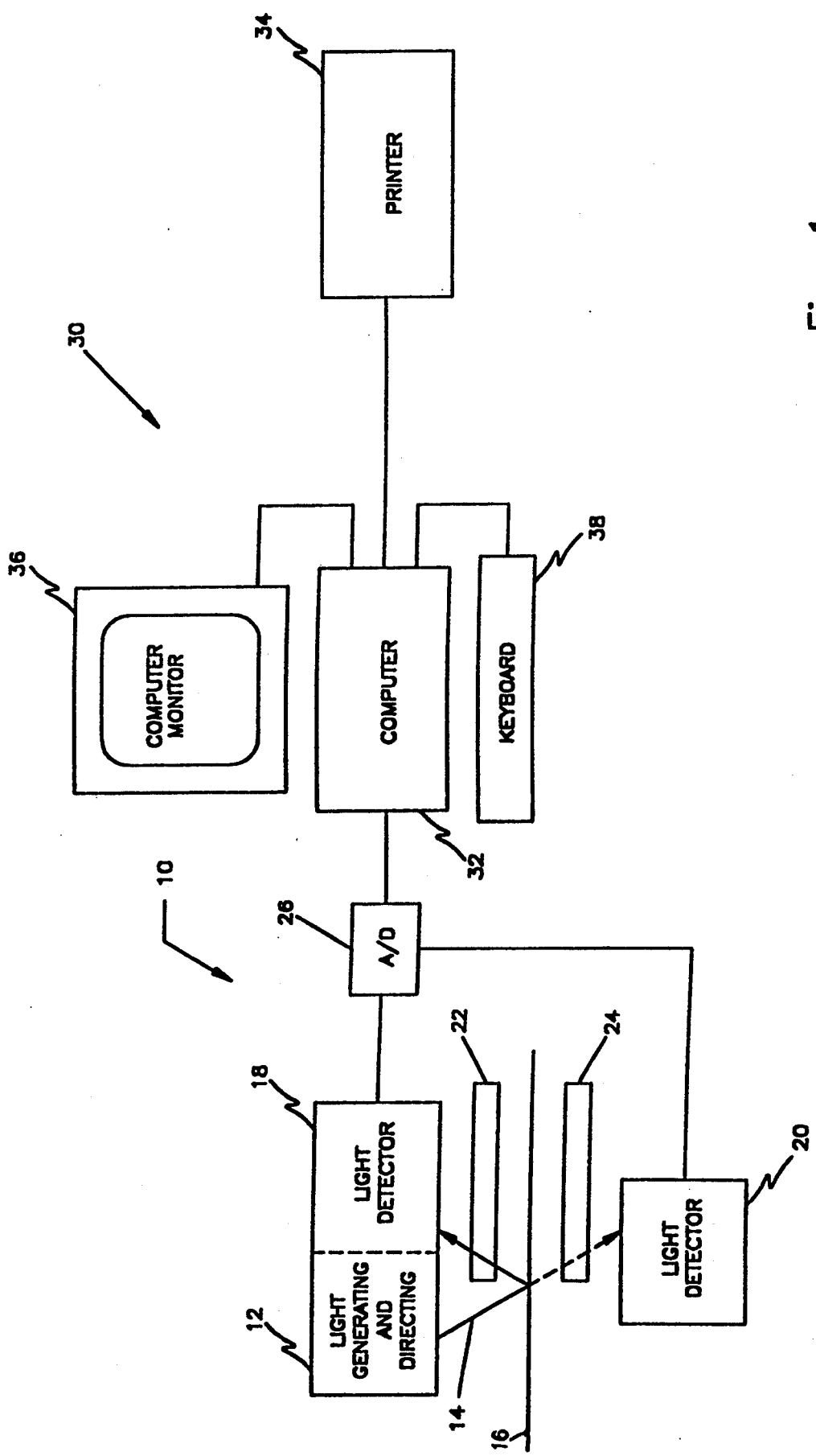
FIG. 1 illustrates a schematic system for reproducing images.

Throughout the following detailed description, similar reference characters refer to similar elements in all figures of the drawings.

Referring to FIG. 1, there is shown a system of various electronic or other machine elements typically used by the graphic arts industry to facilitate image reproduction including black and white and colored image reproduction. It should be understood that the depicted system is schematic and should not be considered as limiting to the present invention, but the depicted system is simply used as an aid to this description so as to better understand the scope of this invention.

In view of the above, FIG. 1 illustrates an image scanner 10 comprising means 12 for generating and directing a beam 14 of light for illuminating an original image 16 that we intend to eventually reproduce. The image 16 can be, for instance, a continuous tone black and white (or color) photograph. Alternatively, the image 16 can be, for instance, a continuous tone black and white (or color) transparency. The generating and directing means 12 can, for instance, cause the beam 14 to scan the image 16 in a sequential raster fashion. The scanner 10 includes a light detector 18 can be used to collect the light reflected from a photograph 16. Alternatively or in addition, the scanner 10 may include a light detector 20 which can be used to collect the light transmitted through a transparency 16. The image scanner 10 then generates an electrical video signal output which contains image information for each picture element or pixel of the original image 16. A filter wheel 22 can contain a plurality of filters, such as 3 filters and a clear space, positioned between the image 16 and the detector 18 to filter the beam 14 reflecting from the photograph 16, so that specific image information for each of three preselected colors, i.e., magenta, cyan and yellow, as well as black is obtained for each scanned picture element or pixel. A similar filter wheel 24 can be used to filter the beam 14 passing through the transparency 16.

The information for the four colors, black being also considered a color comprising a gray scale of tones such as are found in a black and white picture, may be obtained simultaneously and outputted in four parallel channels, by splitting the beam 14 through the filters in the filter wheel 22 or 24 and using four detectors 18 or 20, or it may be sequential, each color obtained after a complete scan of the image, or any other variation. Preferably, an analog to digital (A/D) converter 26 will be included in the scanner 10 to provide a digital output image density signal value for each of the four colors for each pixel. For each pixel, the output values from the A/D converter 26 can be referred to as original color separation image optical density values or data $D_o$. The original color separation image optical density values $D_o$ are sent to a processor unit 30 which may include a computer 32 with appropriate software adapted to process the image data prior to sending the data to a means for displaying a reproduced or copy image. The displaying means may include a recorder or printer 34 or a computer monitor 36, such as a color monitor. The processor unit 30 may include means 38 for providing operator input, such as a keyboard, a mouse and/or other devices.

Optical density values do not change linearly from light to dark, so the original color separation image optical density values or data (D) can be converted to linear darkness values (V) by any means, such as using the Bartleson-Breneman equation which is as follows:

$$V = 1.1123 * [1 - [[10^{-D} + 1.0103]/1.0103]^{0.5}]. \quad (1)$$

Regardless of the apparatus and method employed, original color separation image linear darkness values $V_o(s,t)$ are obtained or generated for each picture element or pixel (s,t) of an original image for each color to be used in the reproduction.

For reproduction of a monochrome black and white original image, a single set of original color separation image linear darkness values $V_o(s,t)$ is obtained where the color is defined to be black. The original color separation image linear darkness values $V_o(s,t)$ corresponding to the color black can be referred to as values $K_o(s,t)$. Typically, for reproduction of a multi-color image on a computer color display monitor, a set of original color separation image linear darkness values $V_o(s,t)$ is obtained for each color to be used in displaying the image. Such colors consist of red, green and blue resulting in original color separation image linear values $R_o(s,t)$, $G_o(s,t)$ and $B_o(s,t)$, respectively. Using a scanner that generates 8 bits of binary information for each input pixel (s,t), each original darkness value $K_o$, $R_o$, $B_o$ and $G_o$ can have any integer value between and including 0 and 255. When printing a reproduction on a printer, the set of colors preferably consist of cyan, magenta, yellow and black, where black is defined as a color. The original color separation image linear darkness values $V_o(s,t)$ corresponding to the colors cyan, magenta and yellow can be referred to as values $C_o(s,t)$, $M_o(s,t)$ and $Y_o(s,t)$, respectively. The $C_o$, $M_o$ and $Y_o$ values are real numbers within the range of $0 \leq V_o \leq 1$.

For the purpose of explaining the present invention, when original red, green and blue separation image linear darkness values $V_o(s,t)$ are provided, we will convert them to corresponding original cyan, magenta and yellow separation image linear darkness values $V_o(s,t)$ using the following equations:

$$C_o = 1 - R_o/255 \quad (2)$$

$$M_o = 1 - G_o/255 \quad (3)$$

$$Y_o = 1 - B_o/255 \quad (4)$$

The present invention comprises a method for producing a multitone image corresponding to an array of output pixels (i,j) from original darkness values $V_o(s,t)$ for at least one color of an array of input pixels (s,t) representative of an original image. Preferably the original image is a continuous tone image. However, the original image can have any form. The original image can even be a virtual image, such as computer generated virtual image, as opposed to a real or actual image.

The present method is adapted to use a set of output (or destination) darkness levels U for each color to be used in the reproduction. The set comprises a number N which is greater than 2 for at least one of the colors used in the reproduction. The number for each set can be the same or different. In a typical halftoning process, the total number N of output darkness levels U used to reproduce each color is two, a first level where the single tone dot is "on" and a second level where the single tone dot is "off". In the multitoning process of the present invention, there are at least 3 output (or destination) darkness levels U available for each output pixel (i,j). For instance, like the halftoning process, a first one of the output darkness levels U can be where a first black (or other color) tone dot is "on", a second output darkness level U can be where the first black (or other color) tone dot is "off" and a third level U can be a second tone or shade of the color intermediate between the first level and the second level.

Typical graphics adaptors or controllers for color monitors provide a total of 256 palette indices P. As a result, the product of the number of output darkness levels U for each of the colors used can not exceed 256. While it is reasonable to make the number of output darkness levels U the same for each color, this may not be the best possible distribution because the visual system is not equally sensitive to the individual colors. In terms of computational efficiency, it is preferred to assign 5 equally spaced output darkness levels U to each color. This makes the output darkness interval between adjacent levels to be $\frac{1}{4}$ of the total of the intervals. It further makes the set of output or reproduction darkness values $V_r$ to be $\{0, \frac{1}{4}, \frac{1}{2}, \frac{3}{4}, 1\}$ where the values $\frac{1}{4}, \frac{1}{2},$ and $\frac{3}{4}$ are intermediate gray levels or tonal shades between the value 0 (representing dot "off") and the value 1 (representing the use of the darkest dot of the set of output tones). It further uses less than half (i.e., 5*5*5=125) of the possible 256 palette indices P.

Thus, if not already accomplished, the method of the present invention includes establishing a set of output darkness levels U to be used for each color in the reproduction.

After the set(s) of output darkness levels U are established for each color, the process of the present invention includes determining or selecting one of the preestablished set of output darkness levels U corresponding to selected ones of the original darkness values $V_o$ of the input pixels (s,t).

If the number of input pixels (s,t) is the same as the number of output pixels (i,j), then one of the preestablished set of output darkness levels (U) can be determined or selected for each of the original darkness values $V_o$ of the input pixels (s,t). If the number of input pixels (s,t) is more than the number of output pixels (i,j), then certain ones of the original darkness values $V_o$ of the input pixels (s,t) can be skipped in selecting or determining one of the preestablished set of output darkness levels U for corresponding original darkness values $V_o$ of the input pixels (s,t). If the number of input pixels (s,t) is less than the number of output pixels (i,j), then output darkness levels U are determined or selected for each of the original darkness values $V_o$ of the input pixels (s,t) and such output darkness levels U can be repeated for extra output pixels (i,j).

In a first embodiment, in order to determine or select the output darkness levels U corresponding to the original darkness values $V_o$ of the input pixels (s,t), the following equations are used:

$$E_{in}(i,j)=a*E_{out}(i,j-1)+b*E_{out}(i-1,j+1)+c*E_{out}(i-1,j)+d*E_{out}(i-1,j-1), \quad (5)$$

$$U(i,j)= \lfloor (N-1)V_o(s,t)+E_{in}(i,j)+\tfrac{1}{2} \rfloor \quad (6)$$

$$E_{out}(i,j)=(N-1)V_o(s,t)+E_{in}(i,j)-U(i,j) \quad (7)$$

where a, b, c and d are constants such that a+b+c+d is equal to or substantially equal to 1. Further, the half brackets "$\lfloor \quad \rfloor$" indicate the floor function which is the highest integer less than or equal to the real number contained in the brackets. For instance, the floor function of 1.3, (i.e., $\lfloor 1.3 \rfloor$) is 1. Further, $\lfloor -1.3 \rfloor$ is $-2$.

In a second embodiment, the output darkness levels U corresponding to the original darkness values $V_o$ of the input pixels (s,t) are determined or selected using equations (5) and (6). However, instead of equation (7), $E_{out}(i,j)$ is calculated using the following equation:

$$E_{out}(i,j)=F[(N-1)V_o(s,t)+E_{in}(i,j)], \quad (8)$$

where F[X] is the sign extended fraction part of the real number X.

A sign extended fraction part is determined by first subtracting the floor of the real number from the real number. Then if the result is greater than or equal to $\frac{1}{2}$, then subtract 1 from the result to obtain the sign extended fraction part. For instance, the sign extended fraction part of 1.7 is determined by first subtracting 1. Then since the result which is 0.7 is determined by greater than $\frac{1}{2}$, 1 is subtracted from 0.7 leaving $-0.3$ which is the sign extended fraction part of 1.7. On the other hand, if the result is less than $\frac{1}{2}$, then the sign extended fraction part is the result.

In this second embodiment, $E_{out}(i,j)$ can be determined using equation (8) prior to calculating U(i,j) for the same pixel (i,j). If $E_{out}(i,j)$ is determined before U, then instead of using equation (6), U can be determined from equation (7) rewritten as follows:

$$U(i,j)=(N-1)V_o(s,t)+E_{in}(i,j)-E_{out}(i,j), \quad (9)$$

Preferably, $N-1$ is a power of 2. For instance, N=2, 3, 5, 9, etc. Further, preferably the multiplication by $N-1$ in equations (6)–(9) is done by a binary shift.

In each embodiment, the respective computations are performed for each output pixel (i,j) in sequential raster fashion. For instance, $E_{in}(i,J)$, U(i,j) and $E_{out}(i,j)$ are first calculated for output pixel (1,1). Then $E_{in}(i,j)$, U(i,j) and $E_{out}(i,j)$ are calculated for adjacent or neighbor pixels in the scan line 1, one at a time, each time increasing j by 1 until $E_{in}(i,j)$, U(i,j) and $E_{out}(i,j)$ are determined for each pixel (1,j). Then the same is accomplished for successive scan lines, increasing i by 1 each time until $E_{in}(i,j)$, U(i,j) and $E_{out}(i,j)$ are determined for all pixels (i,j). It should be pointed out that $E_{out}(i,j)$ need not be determined for the last pixel in the last scan line since this error is not distributed to another pixel.

Like the Floyd-Steinberg algorithm used in halftone processes, the above equations used in the present multitone process are based on the principle that there is an error value associated with each multitone output pixel (i,j) which is the difference between its output darkness value $V_r(i,j)$ and the darkness value $V_o(s,t)$ of the corresponding original image pixel (s,t). Thus, this error is distributed to neighboring pixels in determining which output darkness value $V_r$ will be assigned to output pixels (i,j). The relation between U and $V_r$ is $U=(N-1)V_r$.

Figure 2:
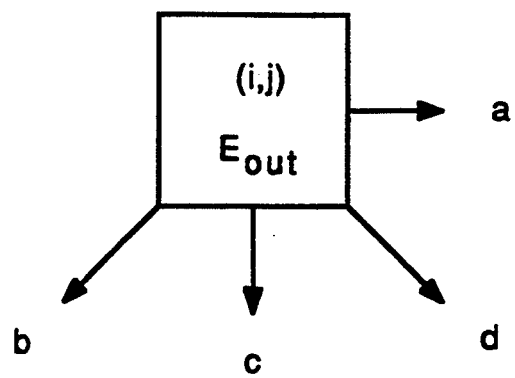
FIG. 2 illustrates an output pixel and associated reproduction error distribution factors.

This error distribution concept is illustrated in FIG. 2. In FIG. 2, one output pixel (i, j) is illustrated with an error value $E_{out}$. Certain percentages or fractions of the output error value $E_{out}$ will be distributed to neighboring output pixels to accumulate an input error $E_{in}$ for each output pixel (i,j) where the input error $E_{in}$ is used in the calculation of the ouput darkness level U(i,j) of the particular pixel (i,j). The first output pixel (1,1) will have no input error $E_{in}$ associated with it. The letters a, b, c and d in FIG. 2 represent the fractions or weighting factors of the output error value $E_{out}(i,j)$ that will be added to the input error $E_{in}$ of four adjacent neighbor output pixels. The fractions or weighting factors a, b, c and d can be determined experimentally. Preferably, a=7/16, b=3/16, c=5/16 and d=1/16.

Then the output darkness levels U(i, j) are used to produce the multitone image representative of the original image. If more than one ouput color is used, the output darkness levels U(i,j) are selected or determined for each color independently as described above. Then the output darkness levels U(i,j) for each color are used to produce the multitone and multi-color image representative of the original image. The image produced can be a visible image reproduced on a substrate, such as paper, or a computer display screen. Alternatively, the image can be a virtual image stored in memory in the computer 32 or elsewhere.

Figure 3:
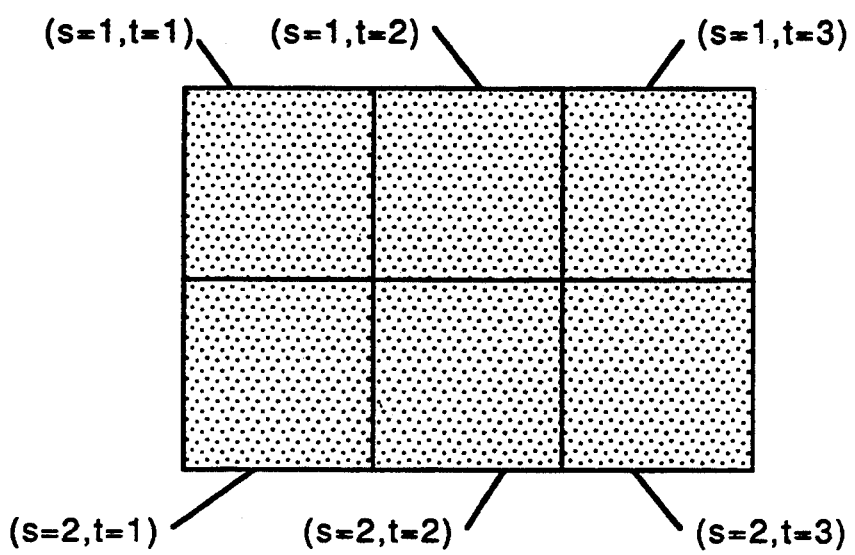
FIG. 3 illustrates an original sample image divided into 6 pixels.
Figure 4:
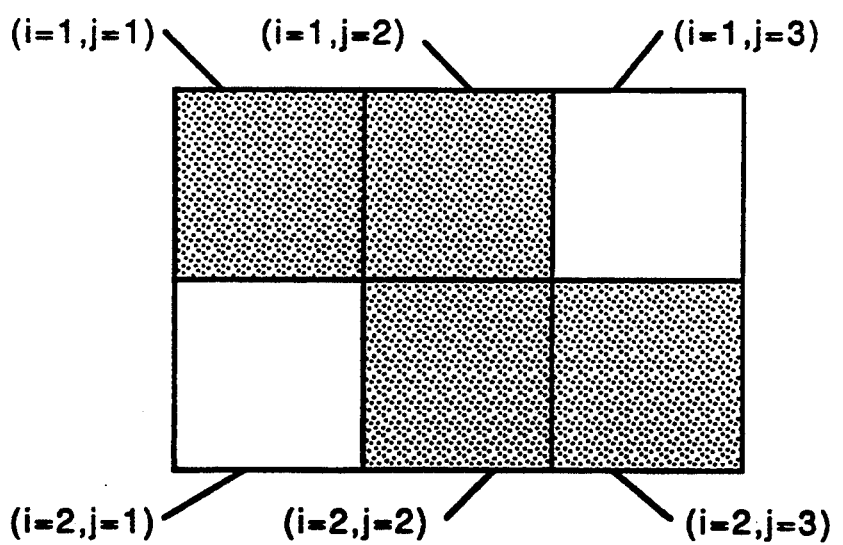
FIG. 4 illustrates a reproduction of the original sample image of FIG. 3 using the process of the present invention.

To illustrate the above described method of the present invention, an example is provided determining the output darkness levels U(i,j) associated with one color for a set of 6 output pixels (i, j) corresponding one to one to original darkness values $V_o(i,j)$ of 6 input pixels (s,t), where (1) i and s are 1 or 2 and (2) j and t are 1, 2 or 3. FIG. 3 represents an original image which has been divided into 6 pixels, specifically original or input pixels (1,1), (1,2), (1,3), (2,1), (2,2), and (2,3). FIG. 4 represents the reproduced image using the multitone process of the present invention.

The number N of tones or output darkness levels U chosen or established is assumed to be 3, (i.e., levels 0, 1 and 2) which are equally spaced providing a corresponding set of output darkness values $V_r$ comprising 0, ½ and 1. For the purposes of this illustration, the original darkness value $V_o$ of each one of the 6 input pixels (s,t) is assumed to be ⅝.

First, regarding output pixel (1,1), the input error $E_{in}(1,1)$ associated with it is 0. The output darkness level U(1,1) corresponding to the original darkness value U(1,1) Of the input pixel (1,1) is determined using equation (6) as follows:

$$U(1,1) = \lfloor (N-1)V_o(1,1) + E_{in}(1,1) + \tfrac{1}{2} \rfloor$$
$$= \lfloor (3-1)\tfrac{5}{8} + 0 + \tfrac{1}{2} \rfloor$$
$$= \lfloor 1.17 \rfloor$$
$$= 1 \text{ (which has a corresponding output darkness value } V_r(1,1) \text{ of } \tfrac{1}{2})$$

Thus, as illustrated in FIG. 4, the corresponding output pixel (1,1) will be reproduced with the output darkness value $V_r(1,1)$ being ½.

Next the output error value $E_{out}$ associated with this determination is calculated using equation (7) as follows:

$$E_{out}(1,1) = (N-1)V_o(1,1) + E_{in}(1,1) - U(1,1)$$
$$= (3-1)\tfrac{5}{8} + 0 - 1$$
$$= -\tfrac{1}{4}$$

Second, regarding output pixel (1,2), the input error $E_{in}(1,2)$ associated with output pixel (1,2) is determined using equation (5):

$$E_{in}(1,2) = a*E_{out}(i,j-1) + b*E_{out}(i-1,j+1) +$$
$$c*E_{out}(i-1,j) + d*E_{out}(i-1,j-1),$$
$$= 7/16(-\tfrac{1}{4}) + 0 + 0 + 0$$
$$= -0.14$$

The output darkness level U(1,2) corresponding to the original darkness value $V_o(1,2)$ of the input pixel (1,2) is determined using equation (5) as follows:

$$U(1,2) = \lfloor (N-1)V_o(1,2) + E_{in}(1,2) + \tfrac{1}{2} \rfloor$$
$$= \lfloor (3-1)\tfrac{5}{8} + (-0.14) + \tfrac{1}{2} \rfloor$$
$$= \lfloor 1.03 \rfloor$$
$$= 1 \text{ (which has a corresponding output darkness value } V_r(1,2) \text{ of } \tfrac{1}{2})$$

Thus, as illustrated in FIG. 4, the corresponding output pixel (1,2) will be reproduced with the output darkness value $V_r(1,2)$ being ½.

Next the output error value $E_{out}$ associated with this determination is calculated using equation (7) as follows:

$$E_{out}(1,2) = (N-1)V_o(1,2) + E_{in}(1,2) - U(1,2)$$
$$= (3-1)\tfrac{5}{8} + (-0.14) - 1$$
$$= -0.47$$

Third, regarding output pixel (1,3), the input error $E_{in}$ associated with output pixel (1,3) is determined using equation (5):

$$E_{in}(1,3) = a*E_{out}(i,j-1) + b*E_{out}(i-1,j+1) +$$
$$c*E_{out}(i-1,j) + d*E_{out}(i-1,j-1),$$
$$= 7/16(-0.47) + 0 + 0 + 0$$
$$= -0.21$$

The output darkness level U(1,3) corresponding to the original darkness value $V_o(1,3)$ of the input pixel (1,3) is determined using equation (6) as follows:

$$U(1,3) = \lfloor (N-1)V_o(1,3) + E_{in}(1,3) + \tfrac{1}{2} \rfloor$$
$$= \lfloor (3-1)\tfrac{5}{8} + (-0.21) + \tfrac{1}{2} \rfloor$$
$$= \lfloor 0.96 \rfloor$$
$$= 0 \text{ (which has a corresponding output darkness value } V_r(1,3) \text{ of } 0)$$

Thus, as illustrated in FIG. 4, the corresponding output pixel (1,3) will be reproduced with the output darkness value $V_r(1,3)$ being 0.

Next the output error value $E_{out}$ associated with this determination is calculated using equation (7) as follows:

$$E_{out}(1,3) = (N - 1)V_o(1,3) + E_{in}(1,3) - U(1,3)$$
$$= (3 - 1)\tfrac{1}{2} + (-0.21) - 0$$
$$= 0.46$$

Fourth, regarding output pixel (2,1), the input error $E_{in}$ associated with output pixel (2,1) is determined using equation (5):

$$E_{in}(2,1) = a*E_{out}(i,j - 1) + b*E_{out}(i - 1, j + 1) +$$
$$c*E_{out}(i - 1, j) + d*E_{out}(i - 1, j - 1)$$
$$= 0 + 3/16(-0.47) + 5/16(-\tfrac{1}{2}) + 0$$
$$= -0.20$$

The output darkness level U(2,1) corresponding to the original darkness value $V_o(2,1)$ of the input pixel (2,1) is determined using equation (6) as follows:

$$U(2,1) = \lfloor (N - 1)V_o(2,1) + E_{in}(2,1) + \tfrac{1}{2} \rfloor$$
$$= \lfloor (3 - 1)\tfrac{1}{2} + (-0.20) + \tfrac{1}{2} \rfloor$$
$$= \lfloor 0.97 \rfloor$$
$$= 0 \text{ (which has a corresponding output}$$
$$\text{darkness value } V_r(2,1) \text{ of 0)}$$

Thus, as illustrated in FIG. 4, the corresponding output pixel (2,1) will be reproduced with the output darkness value $V_r(2,1)$ being 0.

Next the output error value $E_{out}$ associated with this determination is calculated using equation (7) as follows:

$$E_{out}(2,1) = (N - 1)V_o(2,1) + E_{in}(2,1) - U(2,1)$$
$$= (3 - 1)\tfrac{1}{2} + (-0.20) - 0$$
$$= 0.47$$

Fifth, regarding output pixel (2,2), the input error $E_{in}$ associated with output pixel (2,2) is determined using equation (5):

$$E_{in}(2,2) = a*E_{out}(i,j - 1) + b*E_{out}(i - 1, j + 1) +$$
$$c*E_{out}(i - 1, j) + d*E_{out}(i - 1, j - 1)$$
$$= 7/16(0.47) + 3/16(0.46) +$$
$$5/16(-0.47) + 1/16(-\tfrac{1}{2})$$
$$= 0.13$$

The output darkness level U(2,2) corresponding to the original darkness value $V_o(2,2)$ of the input pixel (2,2) is determined using equation (6) as follows:

$$U(2,2) = \lfloor (N - 1)V_o(2,2) + E_{in}(2,2) + \tfrac{1}{2} \rfloor$$
$$= \lfloor (3 - 1)\tfrac{1}{2} + (0.13) + \tfrac{1}{2} \rfloor$$
$$= \lfloor 1.30 \rfloor$$
$$= 1 \text{ (which has a corresponding output}$$
$$\text{darkness value } V_r(2,2) \text{ of } \tfrac{1}{2})$$

Thus, as illustrated in FIG. 4, the corresponding output pixel (2,2) will be reproduced with the output darkness value $V_r(2,2)$ being $\tfrac{1}{2}$.

Next, the output error value $E_{out}$ associated with this determination is calculated using equation (7) as follows:

$$E_{out}(2,2) = (N - 1)V_o(2,2) + E_{in}(2,2) - U(2,2)$$
$$= (3 - 1)\tfrac{1}{2} + (0.13) - 1$$
$$= -0.20$$

Sixth, regarding output pixel (2,3), the input error $E_{in}$ associated with pixel (2,3) is determined using equation (5):

$$E_{in}(2,3) = a*E_{out}(i,j - 1) + b*E_{out}(i - 1, j + 1) +$$
$$c*E_{out}(i - 1, j) + d*E_{out}(i - 1, j - 1)$$
$$= 7/16(-0.20) + 0 + 5/16(0.46) +$$
$$1/16(-0.47)$$
$$= 0.02$$

The output darkness level U(2,3) corresponding to the original darkness value $V_o(2,3)$ of the input pixel (2,3) is determined using equation (5) as follows:

$$U(2,3) = \lfloor (N - 1)V_o(2,3) + E_{in}(2,3) + \tfrac{1}{2} \rfloor$$
$$= \lfloor (3 - 1)\tfrac{1}{2} + (0.02) + \tfrac{1}{2} \rfloor$$
$$= \lfloor 1.19 \rfloor$$
$$= 1 \text{ (which has a corresponding output}$$
$$\text{darkness value } V_r(2,3) \text{ of } \tfrac{1}{2})$$

Thus, as illustrated in FIG. 4, the corresponding output pixel (2,3) will be reproduced with the output darkness value $V_r(2,3)$ being $\tfrac{1}{2}$.

The output error value $E_{out}$ associated with this determination is not needed. Thus, it doesn't need to be calculated.

As can be seen from FIG. 4, the output image has four pixels with darkness values equal to $\tfrac{1}{2}$ and two pixels with darkness values of 0. This is a good reproduction of the pixels (s,t) in the original image because the average intensity over the output pixels (i,j) equals the average intensity of the input pixels (s,t) where intensity is defined as 1 minus the darkness value.

If the output image is to be displayed on a color monitor, one can convert the output darkness levels U(i,j) for each color for each pixel to a single palette index P(i,j) using the equation:

$$P(i,j) = (U_c*N_m + U_m)*N_y + U_y. \quad (10)$$

where (1) $N_c$, $N_m$ and $N_y$ are the number N of output darkness levels U for the colors cyan, magenta and yellow, respectively, and (2) $U_c$, $U_m$ and $U_y$ are the output darkness levels U for the colors cyan, magenta and yellow, respectively.

As an example, assume for one output pixel (i,j), $U_c=1$, $U_m=2$ and $u_y=4$. (These would have been determined using equation (6) or (9).) Further, assume $N_c=N_m=N_y=5$. Plugging the numbers into equation 10, we get:

$$P(i,j) = (U_c * N_m + U_m) * N_y + U_y$$
$$= (1 * 5 + 2) * 5 + 4$$
$$= 39$$

Then the palette index P(i,j) can be set to or used with a look-up table of red, green and blue voltage values needed to display the corresponding darkness values $V_r$ for the combination of the 3 output colors (i.e., red, green and blue).

In implementing the process of the present invention, it is preferred to use a computer to perform the various calculations needed to generate output darkness levels U(i,j) corresponding to original color separation values $V_o$(s,t) for input pixels (s,t). An illustrative software embodiment for performing the method of the present invention is included in an Appendix A to this specification and appears immediately before the claims. In this appended software embodiment of the present invention, the number N of output darkness levels U is 5 for each of the set of output colors comprising cyan, magenta and yellow. This software program is written in the C language for the Sun Sparcstation or the Sun 3/60 Workstation.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. A method for producing a multitone reproduction image comprised of N discrete multiple tones representative of an original continuous tone image, comprising the steps of:
   scanning an array of (s,t) picture elements of said original image to produce an original image density analog signal Vo(s,t) representative of the darkness value Vo of each picture element (s,t) in said original image;
   converting said original image density analog signal into a digital representation;
   digitally processing said digital representation of said original image density signal to produce a reproduction image density signal representative of one of N reproduction darkness values Vr for each picture element (i,j) in an array of reproduction picture elements where Vo(s,t) and Vr(i,j) are related by U(i,j)= $\lfloor$(N−1) Vo(s,t)+Ein(i,j)+$\frac{1}{2}$$\rfloor$ in which U represents a darkness level defined by U=(N−1) Vr and Ein represents an input error given by Ein(i,j)=aEout(i,j−1)+bEout(i−1, j+1)+cEout(i−1,j)+dEout(i−1, j−1) where a, b, c and d are constants and the output error Eout-(i,j)=(N−1) Vo(s,t)+Ein(i,j)−U(i,j); and
   controlling an image reproduction apparatus, in response to said reproduction image density signal to produce said multitone reproduction image.

2. The method of claim 1, wherein a=7/16, b=3/16, c=5/16, and d=1/16.

3. The method of claim 1, wherein said darkness value Vo includes discrete values whose number exceeds N.

4. The method of claim 1, wherein N equals 5.

5. The method of claim 1, further comprising the step of repeating said scanning, processing and controlling steps for a plurality of colors wherein N equals 5 for each of said colors.

6. The method of claim 1, wherein a+b+c+d is substantially equal to 1.

7. The method of claim 1, wherein N−1 is a power of 2 and the multiplication by N−1 is done by a binary shift.

8. The method of claim 1, further comprising the step of repeating said scanning, processing and controlling steps for a plurality of colors wherein said controlling step includes the step of converting the output darkness levels u for said colors to a single palette index P defined by P(i,j)=(UcNm+Um)Ny+Uy where the subscripts c, m and y respectively indicate the colors cyan, magenta and yellow.

9. A method for producing a multitone reproduction image comprised of N discrete multiple tones representative of an original continuous tone image, comprising the steps of:
   scanning an array of (s,t) picture elements of said original image to produce an original image density analog signal Vo(s,t) representative of the darkness value Vo of each picture element (s,t) in said original image;
   converting said original image density analog signal into a digital representation;
   digitally processing said digital representation of said original image density signal to produce a reproduction image density signal representative of one of N reproduction darkness values Vr for each picture element (i,j) in an array of reproduction picture elements where Vo(s,t) and Vr(i,j) are related by U(i,j)= $\lfloor$N−1) Vo(s,t)+Ein(i,j)+$\frac{1}{2}$$\rfloor$ in which U represents a darkness level defined by U=(N−1) Vr and Ein represents an input error given by Ein(i,j)=aEout(i,j−1)+bEout(i−1, j+1)+cEout(i−1, j)+dEout(i−1, j−1) where a, b, c and d are constants and the output error Eout-(i,j)=f{(N−1) Vo(s,t)+Ein(i,j)}; and
   controlling an image reproduction apparatus, in response to said reproduction image density signal to produce said multitone reproduction image.

10. A method for producing a multitone reproduction image comprised of N discrete multiple tones representative of an original continuous tone image, comprising the steps of:
    scanning an array of (s,t) picture elements of said original image to produce an original image density analog signal Vo(s,t) representative of the darkness value Vo of each picture element (s,t) in said original image;
    converting said original image density analog signal into a digital representation;
    digitally processing said digital representation of said original image density signal to produce a reproduction image density signal representative of one of N reproduction darkness values Vr for each picture element (i,j) in an array of reproduction picture elements where Vo(s,t) and Vr(i,j) are related by U(i,j)=(N−1) Vo(s,t)+Ein(i,j)−E(i,j) in which U represents a darkness level defined by U=(N−1) Vr and Ein represents an input error given by Ein(i,j)=aEout(i,j−1)+bEout(i−1, j+1)+cEout(i−1, j)+dEout(i−1,j−1) where a, b, c and d are constants and the output error Eout-(i,j)=F{(N−1) Vo(s,t)+Ein(i,j)}; and controlling an image reproduction apparatus, in response to said reproduction image density signal to produce said multitone reproduction image.

11. A system for producing a multitone reproduction image comprised of N discrete multiple tones representative of an original continuous tone image, comprising:

means for scanning an array of (s,t) picture elements of said original image to produce an original image density analog signal Vo(s,t) representative of the darkness value Vo of each picture element (s,t) in said original image;

means for converting said original image density analog signal into a digital representation;

means for digitally processing said digital representation of said original image density signal to produce a reproduction image density signal representative of one of N reproduction darkness values Vr for each picture element (i,j) in an array of reproduction picture elements where Vo(s,t) and Vr(i,j) are related by $U(i,j) = \lfloor (N-1) \text{ Vo})s,t)+\text{Ein}(i,j)+\frac{1}{2} \rfloor$ in which U represents a darkness level defined by $U=(N-1)$ Vr and Ein represents an input error given by $\text{Ein}(i,j)=a\text{Eout}(i,j-1)+b\text{Eout}(i-1, j+1)+c\text{Eout}(i-1, j)+d\text{Eout}(i-1, j-1)$ where a, b, c and d are constants and the output error $\text{Eout}(i,j)=(N-1) \text{ Vo}(s,t)+\text{Ein}(i,j)-U(i,j)$; and means for controlling an image reproduction apparatus, in response to said reproduction image density signal to produce said multitone reproduction image.

12. A system for producing a multitone reproduction image comprised of N discrete multiple tones representative of an original continuous tone image, comprising:

means for scanning an array of (s,t) picture elements of said original image to produce an original image density analog signal Vo(s,t) representative of the darkness value Vo of each picture element (s,t) in said original image;

means for converting said original image density analog signal into a digital representation;

means for digitally processing said digital representation of said original image density signal to produce a reproduction image density signal representative of one of N reproduction darkness values Vr for each picture element (i,j) in an array of reproduction picture elements where Vo(s,t) and Vr(i,j) are related by $U(i,j) = \lfloor (N-1) \text{ Vo}(s,t)+\text{Ein}(i,j)+\frac{1}{2} \rfloor$ in which U represents a darkness level defined by $U=(N-1)$ Vr and Ein represents an input error given by $\text{Ein}(i,j)=a\text{Eout}(i,j-1)+b\text{Eout}(i-1, j+1)+c\text{Eout}(i-1, j)+d\text{Eout}(i-1, j-1)$ where a, b, c and d are constants and the output error $\text{Eout}(i,j)=F\{(N-1) \text{ Vo}(s,t)+\text{Ein}(i,j)\}$; and means for controlling an image reproduction apparatus, in response to said reproduction image density signal to produce said multitone reproduction image.

13. A system for producing a multitone reproduction image comprised of N discrete multiple tones representative of an original continuous tone image, comprising:

means for scanning an array of (s,t) picture elements of said original image to produce an original image density analog signal Vo(s,t) representative of the darkness value Vo of each picture element (s,t) in said original image;

means for converting said original image density analog signal into a digital representation;

means for digitally processing said digital representation of said original image density signal to produce a reproduction image density signal representative of one of N reproduction darkness values Vr for each picture element (i,j) in an array of reproduction picture elements where Vo(s,t) and Vr(i,j) are related by $U(i,j)=(N-1) \text{ Vo}(s,t)+\text{Ein}(i,j)-E(i,j)$ in which U represents a darkness level defined by $U=(N-1)$ Vr and Ein represents an input error given by $\text{Ein}(i,j)=a\text{Eout}(i,j-1)+b\text{Eout}(i-1, j+1)+c\text{Eout}(i-1, j)+d\text{Eout}(i-1, j-1)$ where a, b, c and d are constants and the output error $\text{Eout}(i,j)=F\{(N-1) \text{ Vo}(s,t)+\text{Ein}(i,j)\}$; and means for controlling an image reproduction apparatus, in response to said reproduction image density signal to produce said multitone reproduction image.

* * * * *